(12) United States Patent
Shih

(10) Patent No.: US 6,722,280 B2
(45) Date of Patent: Apr. 20, 2004

(54) METHOD AND SYSTEM FOR SIMULTANEOUS LOADING AND UNLOADING OF SUBSTRATES IN PLATESTTER

(75) Inventor: Richard T. Shih, Andover, MA (US)

(73) Assignee: Agfa Corporation, Wilmington, MA (US)

( * ) Notice: Subject to any disclaimer, the term of this patent is extended or adjusted under 35 U.S.C. 154(b) by 0 days.

(21) Appl. No.: 10/215,572

(22) Filed: Aug. 9, 2002

(65) Prior Publication Data
US 2004/0025731 A1 Feb. 12, 2004

(51) Int. Cl.[7] .................................................. B41F 1/34
(52) U.S. Cl. ....................................... 101/483; 101/477
(58) Field of Search ................................. 101/483, 477, 101/485, 415.1, 409, 378, 389.1, 118; 271/82, 277

(56) References Cited

U.S. PATENT DOCUMENTS

| | | | | |
|---|---|---|---|---|
| 5,331,892 A | * | 7/1994 | Seib et al. ................... | 101/477 |
| 5,555,812 A | * | 9/1996 | Ruckmann et al. .......... | 101/477 |
| 5,709,151 A | * | 1/1998 | Dürr et al. ................... | 101/477 |
| 6,098,536 A | * | 8/2000 | Ohkawa ....................... | 101/118 |
| 6,189,452 B1 | | 2/2001 | Halup et al. | |
| 6,260,482 B1 | | 7/2001 | Halup et al. | |
| 6,295,929 B1 | | 10/2001 | Tice et al. | |
| 6,334,392 B1 | * | 1/2002 | Kawada et al. .......... | 101/415.1 |
| 6,435,084 B1 | * | 8/2002 | Suzuki ........................ | 101/118 |
| 2002/0191995 A1 | * | 12/2002 | Kerr ............................. | 101/415 |
| 2003/0188655 A1 | * | 10/2003 | Argiros et al. ............... | 101/477 |

* cited by examiner

Primary Examiner—Eugene H. Eickholt
(74) Attorney, Agent, or Firm—Grant Houston; Robert A. Sabourin

(57) ABSTRACT

A method for loading and unloading substrates on a drum of an imaging engine is applicable to the loading of plates in a platesetter. The method comprises unclamping a trailing edge of a first substrate of the drum and clamping a header of a second substrate to the drum. The order in which these two steps are performed is not critical to the invention. For example, the clamping and unclamping can happen simultaneously. Alternatively, the unclamping of the trailing edge can occur before the clamping of the header, or visa versa. In any case, the drum is then rotated to eject the first substrate from the drum while installing the second substrate on the drum. The notion here is that, as the drum is rotated, one substrate is being ejected while a second substrate is being installed on the drum. Thereafter, the header of the first substrate is unclamped and the trailing edge of the second substrate is clamped to the drum. The method is directed to decreasing the cycle time and thereby increasing throughput in a substrate exposure system, such as a platesetter or imagesetter. It decreases cycle lime by optimizing the loading and unloading of substrates.

14 Claims, 3 Drawing Sheets

METHOD AND SYSTEM FOR SIMULTANEOUS LOADING AND UNLOADING OF SUBSTRATES IN PLATESTTER

BACKGROUND OF THE INVENTION

Imagesetters and platesetters are used to expose the substrates that are used in many conventional offset printing systems. Imagesetters are typically used to expose the film that is then used to make the plates for the printing system. Platesetters are used to directly expose the plates.

In the case of platesetters, for example, the plates are typically large substrates that have been coated with photosensitive or thermally-sensitive material layers, referred to as the emulsion. For large run applications, the plates are fabricated from aluminum, although organic plates, such as polyester or paper plates, are also available for smaller runs.

Computer-to-plate printing systems are used to render digitally stored print content onto these printing plates. Typically, a computer system is used to drive an imaging engine of the platesetter.

The imaging engine selectively exposes the emulsion that is coated on the plates. After this exposure, the emulsion is developed so that during the printing process, ink will selectively adhere to the plate's surface to transfer the ink to a print medium.

In imagesetters and platesetters, throughput is a critical metric. These systems typically operate in commercial environments. Their throughput is often used as the criteria for selecting between the various commercially available systems.

The cycle time, and consequently throughput, for a platesetter or imagesetter is dictated by the time required: 1) to load the substrate into the imaging engine; 2) for the engine's scanner to expose the substrate; and 3) to unload the substrate. Most conventional systems expose the media by scanning. In a common implementation, the plate or film media is fixed to the outside or inside of a drum and then scanned with a laser source in a raster fashion. The laser's dot is moved longitudinally along the drum's axis, while the drum is rotated under the dot. As a result, by modulating the laser, the substrate is selectively exposed in a continuous helical scan.

The typical approach to reducing the cycle time of the imaging engine focuses on decreasing the time required for the engine's scanner to expose the substrate. Some have approached this problem by increasing the speed at which the laser is modulated, enabling the drum to be rotated at a higher rate. There are limitations, however, in the laser's power and its speed of modulation. Other solutions use spatial light modulators, so that multiple lines of the image can be exposed in each rotation of the drum.

An alternative path to decreasing cycle time concerns loading multiple substrates simultaneously on the drum. In one example, a number of substrates are positioned along the drum's axis. In still another approach, multiple substrates are loaded around the drums' circumference.

This, however, tends to have a limited impact on cycle time. The exposure step is consequently longer, since more substrate surface area must now be exposed. Further, the time to load and unload is also not substantially affected since multiple substrates cannot be loaded on the drum simultaneously.

SUMMARY OF THE INVENTION

The present invention is directed to decreasing the cycle time and thereby increasing throughput in a substrate exposure system, such as a platesetter or imagesetter. It decreases cycle time by optimizing the loading and unloading of substrates.

Specifically, according to the invention, substrates are loaded and unloaded on the same drum simultaneously. As a result, in some implementations, the time to unload and load a single substrate can be reduced by half. That is, the time to unload any given substrate is amortized over the time to load a subsequent substrate.

In general, according to one aspect, the invention features a method for loading and unloading substrates on a drum of an imaging engine.

In the present embodiment, the substrates are plates and the imaging engine is used in a platesetter.

The method comprises unclamping a trailing edge of a first substrate from the drum and clamping a header of a second substrate to the drum. The order in which these two steps are performed is not critical to the invention. For example, the clamping and unclamping can happen simultaneously. Alternatively, the unclamping of the trailing edge can occur before the clamping of the header, or visa versa.

In any case, the drum is then rotated to eject the first substrate from the drum while installing the second substrate on the drum. The notion here is that, as the drum is rotated, one substrate is being ejected while a second substrate is being installed on the drum. Thereafter, the header of the first substrate is unclamped and the trailing edge of the second substrate is clamped to the drum.

Here again, the order in which these final unclamping and clamping steps is performed is not critical. They can occur simultaneously. In other examples, the unclamping occurs before the clamping, or visa versa.

In specific embodiments, the step of unclamping the trailing edge of the first substrate comprises removing a first removable clamp from the drum.

Further, the step of unclamping the header of the first substrate comprises opening a first fixed clamp on the drum, and the step of clamping the header of the second substrate comprises holding the header of the second substrate to the drum with a second fixed clamp.

In the preferred embodiment, the method further comprises loading the first substrate on the drum by clamping the header of the first substrate, and then rotating the drum in a first direction to install the first substrate on the drum and then clamping the trailing edge of the first substrate. This allows this first substrate to then be ejected as previously described.

In the preferred embodiment, the step of rotating the drum to eject the first substrate while installing the second substrate comprises rotating the drum in a second direction, which is opposite the first direction, i.e., the direction in which the drum is rotated when the first substrate is initially installed. As a result, in sequential loading/unloading steps, the drum is rotated in opposite directions.

In general, according to another aspect, the invention comprises an external drum imaging engine. Specifically, it comprises a drum on which substrates are installed and a scanner for exposing the substrates that are installed on the drum. Two fixed header clamps are provided. They are positioned at different locations around the perimeter of the drum for clamping headers of different substrates to the drum. At least one trailing edge clamp is provided for clamping trailing edges of substrates to the drum.

In the preferred embodiment, the header clamps are only operational on alternating substrate exposure steps.

Specifically, during any exposing step, only one of the header clamps is operational, i.e., clamping a header of a substrate, while the other header clamp is non-operational.

Preferably, two input/output ports are provided. Each port either supplies or receives a substrate while the other port receives or supplies, respectively, a different substrate.

The trailing edge clamp is preferably a movable clamp and is, therefore, adjustable in its clamping location around the circumference of the drum. In some examples, two trailing edge clamps are provided and are used during alternating exposure steps, i.e., the two trailing edge clamps are never clamping substrates to the drum at the same time.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. Of the drawings.

DETAILED DESCRIPTION OF THE PREFERRED EMBODIMENTS

Figure 1A:
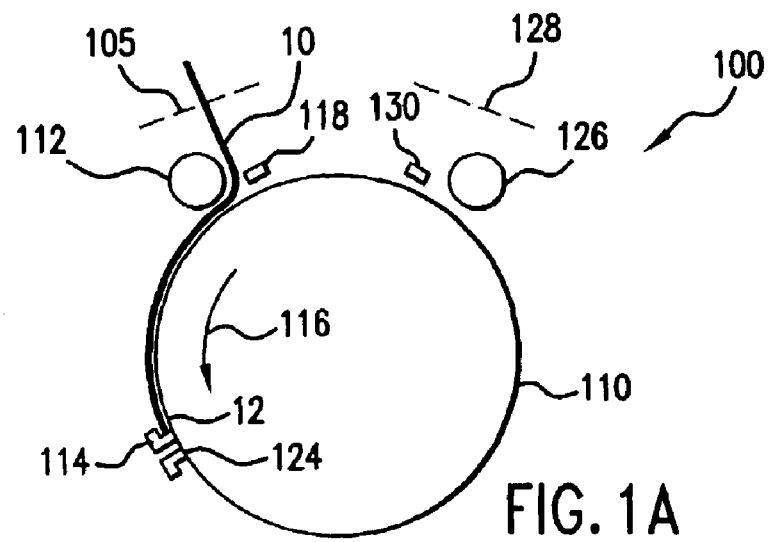
FIG. 1A is a schematic side plan view of the imaging engine of a substrate exposure system, such as a platesetter, which is in the process of loading a first substrate.

FIG. 1A shows the imaging engine 100, which has been constructed according to the principles of the present invention.

Specifically, the imaging engine 100 comprises an external drum 110. Unique to the invention is the fact that it has two plate header clamps 114, 124. These header clamps 114, 124 are located at different positions around the circumference of the drum 110. Moreover, they are positioned to face in an opposed fashion or opposite directions. Specifically, the mouth of the first header clamp 114 faces in a clockwise direction around the drum's perimeter, while the second header clamp 124 faces in a counter clockwise direction.

The imaging engine 100 further comprises a first input/output port 105 and a second input/output port 128. These input/output ports 105, 128 are placed in proximity to respective first and second ironing rollers 112, 126.

Moreover, in the illustrated embodiment, two trailing edge clamps 118, 130 are also provided, which can be lowered to engage a trailing edge of a plate on the drum 110, to thereby clamp the plate to the drum 110.

In the preferred embodiment, these trailing edge clamps 118, 130 are magnetic clamps that attach to the drum using a magnetic attraction force. Specifically, they comprise rare earth magnets.

A substrate 10 is shown being loaded onto the drum 110, to be exposed. Specifically, the substrate 10 is pressed into an engagement with the drum 110 by the first ironing roller 112. The header 12 of the substrate 10 is inserted under a first header clamp 114. The drum is then advanced in the direction of arrow 116 or in the counter clockwise direction. As a result, the length of the substrate 10 is progressively installed onto the outer circumference of the drum 110 as it is advanced.

Figure 1B:
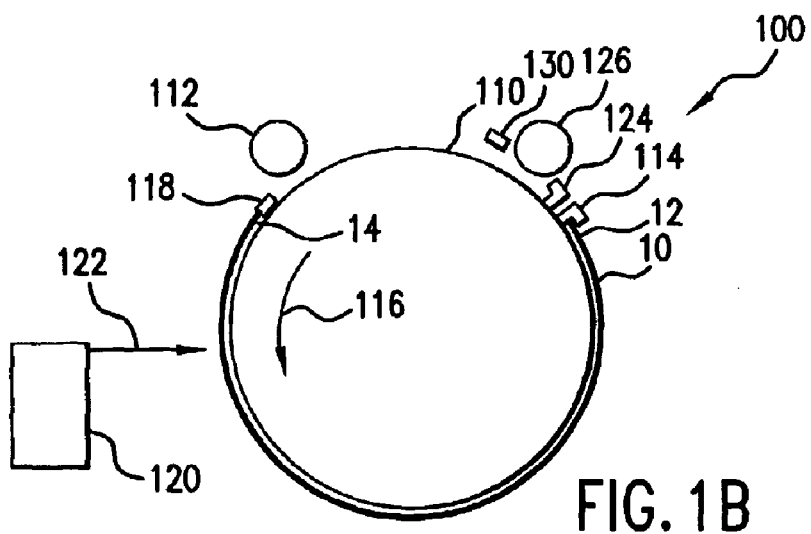
FIG. 1B is a schematic side plan view of the imaging engine with the first substrate fully installed on the drum.

FIG. 1B shows the imaging engine 100 with the substrate 10 fully installed on the outer periphery of the drum 110. Further, the first trailing edge clamp 118 has been lowered into engagement with the drum 110 to hold down the trailing edge 14 of the plate 10.

With the substrate 10 fully installed on the drum 110, the drum is then driven at a high speed in the direction of arrow 116. The emulsion on the outer surface of the plate 10 is selectively exposed by the scanner 120 of the imaging engine 100. Specifically, the scanner generates a modulated laser beam 122, which is scanned over the surface of the plate 10 in a raster fashion to enable the selective exposure of the plate's emulsion.

Figure 1C:
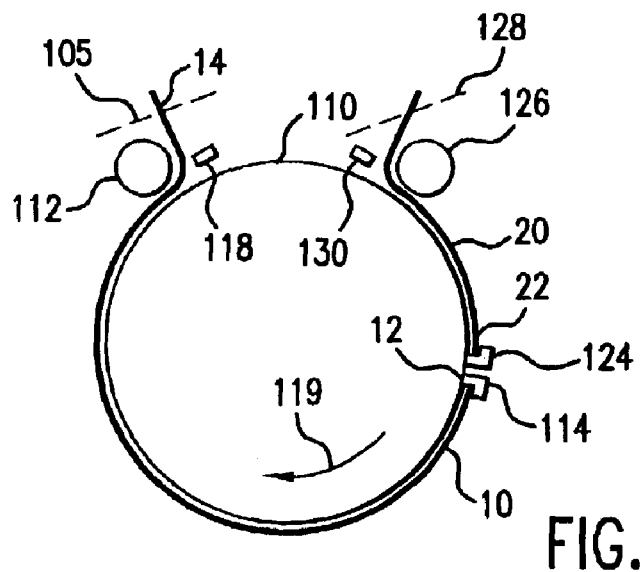
FIG. 1C is a schematic side plan view showing the unloading of the first substrate and the loading of a second substrate, according to the present invention.

As shown in FIG. 1C, once the first substrate 10 has been exposed, the substrate is unloaded while a new substrate 20 is loaded onto the drum 110.

Specifically, the first trailing edge clamp 118 is removed from the drum 110, thereby freeing the trailing edge 14 of the first plate 10. This trailing edge 14 is passed through the first input/output port 105. The ironing roller 112 is used to guide the trailing edge 14 of the first substrate 10.

Simultaneously, a second substrate 20 has its header 22 clamped in a second header clamp 124. The second substrate 20 is guided by the second ironing roller 126 to pass through the second input/output port 128 to be installed on the outer periphery of the drum 110.

During this step of loading and unloading, the drum 110 is rotated in the direction of arrow 119. Specifically, the drum 110 is rotated in the clockwise direction.

As a result, on successive load/unload cycles, the drum 110 is loaded/unloaded by rotation in opposite directions. For example, on a first load/unload cycle, the drum 110 is rotated in a clockwise direction. Then, the drum 110 is rotated in the counter clockwise direction during the next load/unload cycle.

Figure 1D:
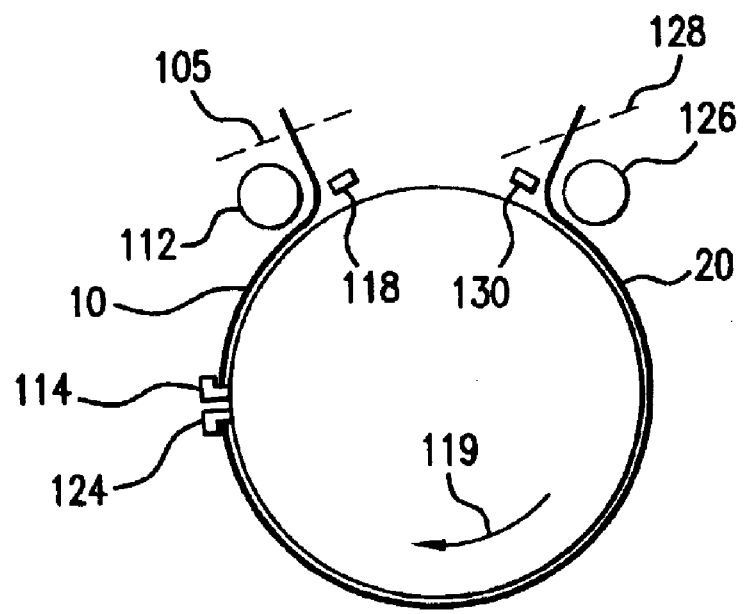
FIG. 1D is a schematic side plan view in which the first substrate is almost completely ejected from the drum and the second substrate almost fully installed on the drum.

FIG. 1D shows the imaging engine during a later stage of the load/unload cycle. Specifically, the first header clamp 114 and the second header clamp 124 have progressed in the direction of arrow 119. Thus, the first substrate 110 continues to be ejected through the first input/output port 105, while the second substrate 20 continues to be drawn in through the second input/output port 128.

Figure 1E:
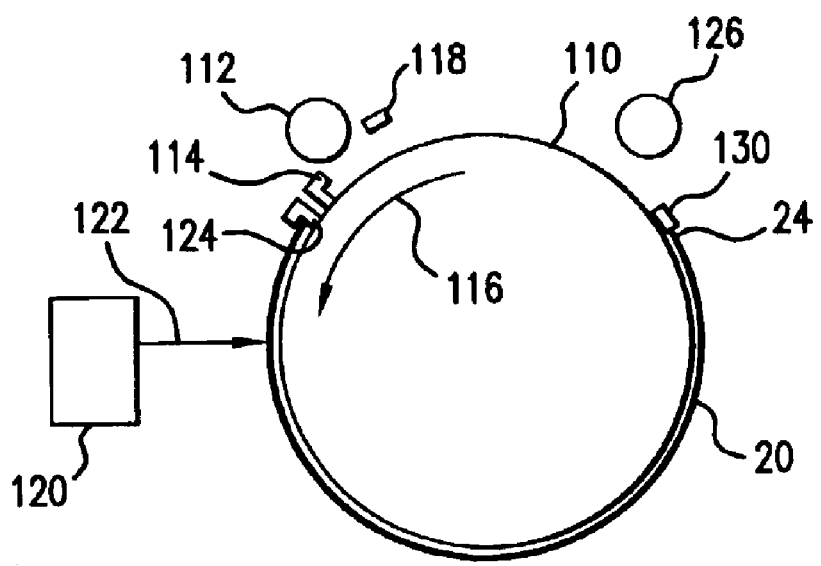
FIG. 1E is a schematic side plan view illustrating the exposure of the second substrate on the drum.

As shown in FIG. 1E, once the first substrate 10 has been fully ejected and the second substrate 20 loaded on the drum 110, a second trailing edge clamp 130 is dropped onto the drum 130 to hold the trailing edge 24 of the second substrate 20 to the drum 110.

Now with the second substrate 20 loaded on the drum 110, the drum 110 is again driven at a high rate of speed in the direction of arrow 116, while the scanner 120 generates the modulated laser beam 122 to thereby selectively expose the emulsion on this second substrate 20.

In this way, substrates can be loaded and ejected from the drum 110 simultaneously. As a result, since the ejection of one substrate is spread over the time to load a second substrate, the respective cycle time when exposing a large number of substrates can be reduced by as much as one-half the time to load/unload a substrate for each cycle. Of course, this does not apply during the loading of a first substrate during a production cycle or unloading of the final substrate, since these processes occur without a corresponding unload or load.

Further, the substrates do not have to be the same size. That is, with proper software intelligence, the system 100 can accommodate differently sized substrates in each cycle.

Figure 2:
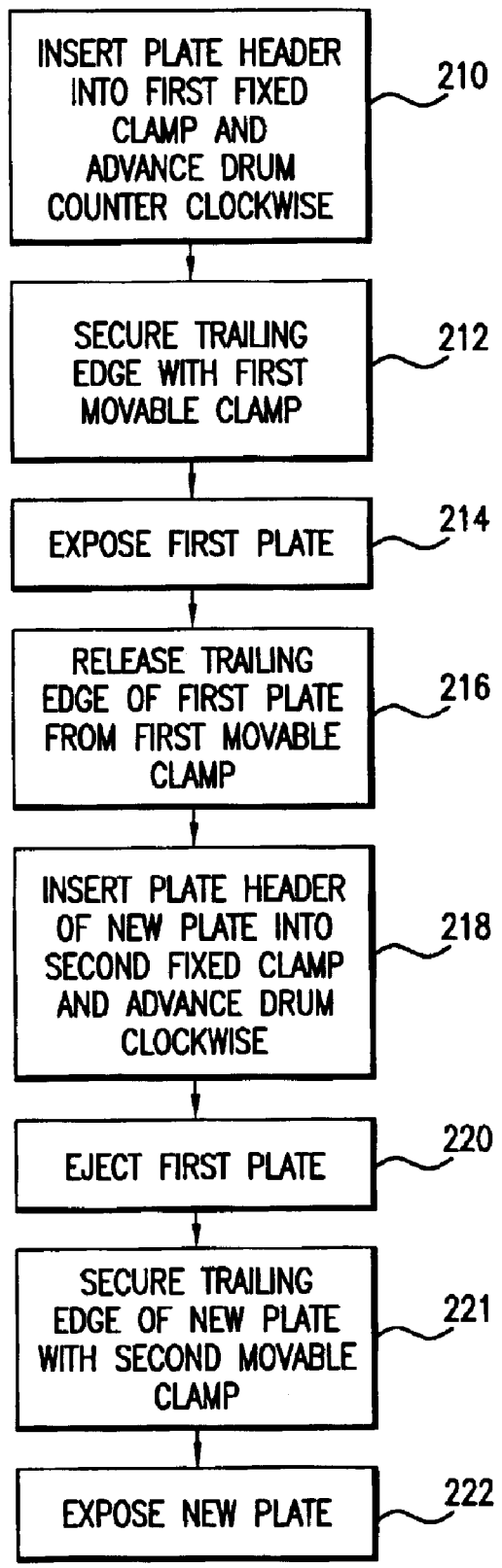
FIG. 2 is a flow diagram illustrating the inventive method for loading and unloading substrates on a drum according to the present invention.

FIG. 2 is a flow diagram summarizing the method according to the present invention.

Specifically, in step 210, the plate header 12 is inserted into the first fixed header clamp 114. The drum 110 is then advanced in a counter clockwise direction to fully install or load the plate 10 onto the drum 110.

Then, once this occurs, the trailing edge 14 of that plate 10 is then held against the drum 110 with a first trailing edge clamp 118 in step 212. Then, this first plate is exposed in step 214.

In step 216, the process for unloading this first substrate 10 occurs by first releasing its trailing edge 14 by removing the first trailing edge or movable clamp 118. The drum 110 is then rotated to feed this first substrate 10 through the first input/output port 105 in step 218. During this step, the drum 110 is rotated in a clockwise direction. Simultaneously, the plate header 22 of the new plate 20 is inserted under the second header or fixed clamp 124. As a result, as the drum is advanced, this new plate 20 is installed on the drum 110.

In step 220, the first plate is fully ejected. Then, in step 221, the second plate 20 has its trailing edge secured with a second trailing edge or movable clamp 130. Then, this new plate 20 is exposed in a step 222.

While this invention has been particularly shown and described with references to preferred embodiments thereof, it will be understood by those skilled in the art that various changes in form and details may be made therein without departing from the scope of the invention encompassed by the appended claims.

What is claimed is:

1. A method for loading and unloading substrates on a drum of an imaging engine, the method comprising:
   unclamping a trailing edge of a first substrate from the drum;
   clamping a header of a second substrate to the drum;
   rotating the drum to eject the first substrate from the drum while installing the second substrate on the drum;
   unclamping a header of the first substrate from the drum; and
   clamping a trailing edge of the second substrate to the drum.

2. A method as claimed in claim 1, wherein the step of unclamping the trailing edge of the first substrate comprises removing a first movable clamp from the drum.

3. A method as claimed in claim 1, wherein:
   the step of unclamping the header of the first substrate comprises opening a first fixed clamp on the drum; and
   the step of clamping the header of the second substrate comprises holding the header of the second substrate to the drum with a second fixed clamp.

4. A method as claimed in claim 1, further comprising:
   loading the first substrate on the drum by clamping the header of the first substrate to the drum with a first fixed clamp;
   rotating the drum in a first direction and installing the first substrate on the drum; and
   clamping the trailing edge of the first substrate to the drum.

5. A method as claimed in claim 4, wherein the step of rotating the drum to eject the first substrate while installing the second substrate comprises rotating the drum in a second direction, which is opposite the first direction.

6. A method as claimed in claim 1, wherein the step of rotating the drum to install the second substrate on the drum comprises urging the second substrate into engagement with the drum with an ironing roller.

7. A method as claimed in claim 1, further comprising:
   exposing the first substrate before the step of unclamping the trailing edge of the first substrate; and
   exposing the second substrate after the step of clamping the trailing edge of the second substrate to the drum.

8. An external drum imaging engine, comprising
   a drum on which substrates are installed;
   an scanner for exposing the substrates that are installed on the drum;
   two fixed header clamps positioned to at different locations around the circumference of the drum for clamping headers of different substrates to the drum; and
   at least one trailing edge clamp for clamping trailing edges of substrates on the drum, the at least one trailing edge clamp being a magnetic clamp.

9. An external drum imaging engine, comprising
   a drum on which substrates are installed;
   an scanner for exposing the substrates that are installed on the drum;
   two fixed header clamps positioned to at different locations around the circumference of the drum for clamping headers of different substrates to the drum; and
   at least one trailing edge clamp for clamping trailing edges of substrates on the drum;
   wherein the header clamps are only operational on alternative substrate exposing steps.

10. An external drum imaging engine, comprising
   a drum on which substrates are installed;
   an scanner for exposing the substrates that are installed on the drum;
   two fixed header clamps positioned to at different locations around the circumference of the drum for clamping headers of different substrates to the drum; and
   at least one trailing edge clamp for clamping trailing edges of substrates on the drum;
   two input/output ports, each port either supplying or receiving a substrate while the other port receives or supplies, respectively, a substrate.

11. An external drum imaging engine as claimed in claim 8, wherein the trailing edge clamp is adjustable in its clamping location around the circumference of the drum.

12. An external drum imaging engine as claimed in claim 8, further comprising two trailing edge clamps for clamping trailing edges of different substrates.

13. An external drum imaging engine, comprising
a drum on which substrates are installed;
an scanner for exposing the substrates that are installed on the drum;
two fixed header clamps positioned to at different locations around the circumference of the drum for clamping headers of different substrates to the drum; and
two trailing edge clamps for clamping trailing edges of different substrates on the drum;
wherein the two trailing edge clamps are never clamping substrates to the drum at the same time.

14. An external drum imaging engine as claimed in claim 8, wherein the substrates are plates.

* * * * *